3,347,528
KNEADING AND MIXING APPARATUS
Heinz List, St. Jakobstrasse 43, and Fritz Ronner, St. Albanstrasse 6, both of Pratteln, Switzerland
Filed Jan. 21, 1965, Ser. No. 426,775
Claims priority, application Switzerland, Jan. 23, 1964, 797/64
5 Claims. (Cl. 259—2)

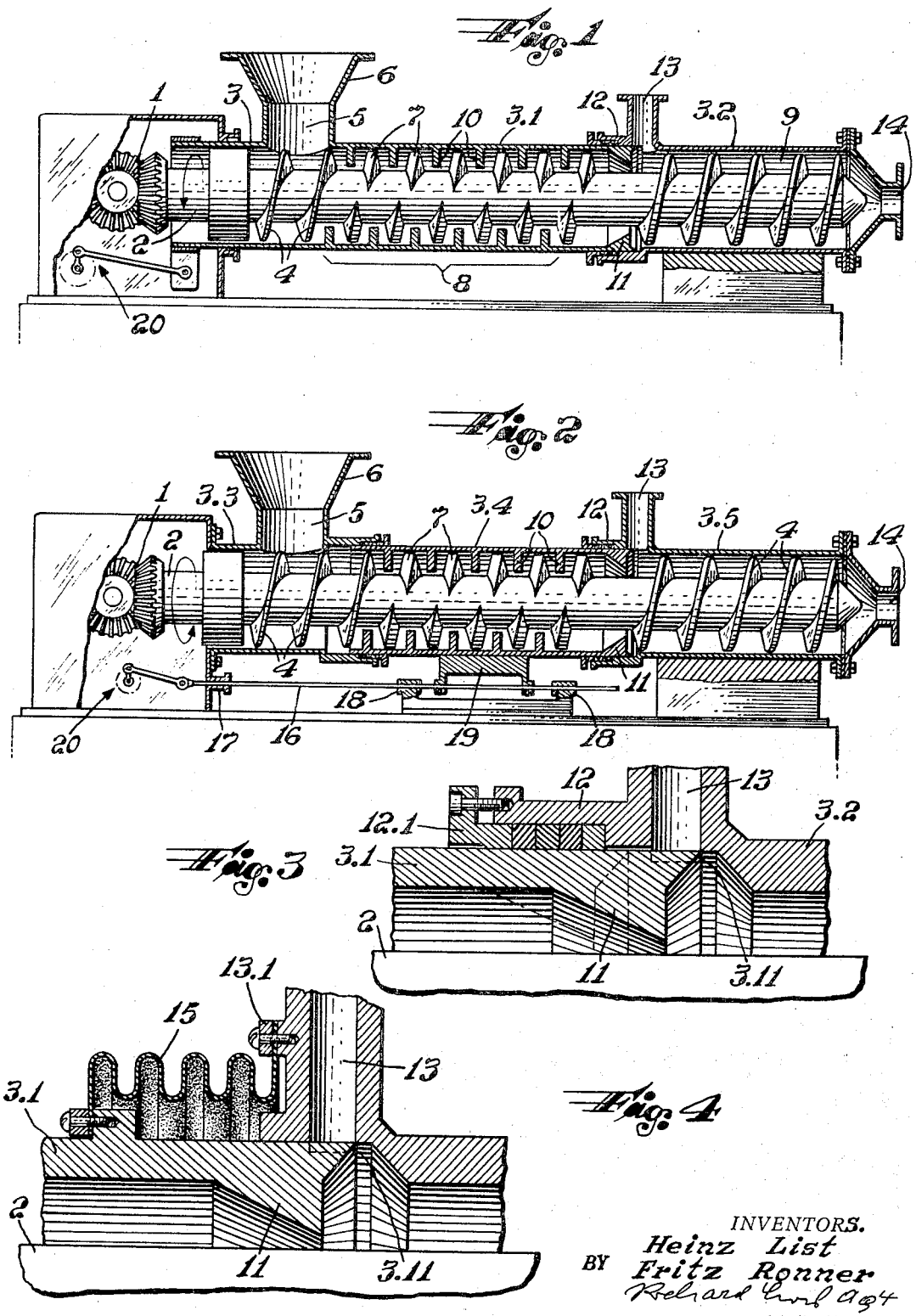

The present invention relates to a kneading and mixing arrangement having a working shaft equipped with threadlike kneading and conveying means. The apparatus of the invention is a screw type mixer and includes a housing in which a screw is rotatably mounted, and a portion of the inner wall of which is provided with kneading teeth.

It is already known to utilize a rotating and simultaneously reciprocating shaft in kneading and mixing arrangements, which construction, apart from the many fundamental advantages, possesses the disadvantage that the discharge of the material to be worked takes place in a pulsating and jerky manner. This renders it impossible to mould profiles directly and to obtain a uniform product. For this reason it has already been proposed to provide mixing and kneading devices with a separately driven discharge screw which is placed after the mixing and kneading arrangement, but this involves the disadvantage that the space requirements are increased.

It is the purpose of the present invention to provide a kneading and mixing arrangement which possesses separate rotating and axially reciprocating parts and works completely free from jerks. The kneading and mixing arrangement according to the invention possesses a rotating screw or working shaft equipped with threadlike kneading and conveying means. The screw is received in a housing equipped with kneading teeth. The apparatus of the invention characterised in that the housing is made in a plurality of parts, one part being mounted before the discharge zone to carry out a reciprocating movement. In this manner the rotating shaft co-operates with an axially reciprocating housing part, while the part of the housing surrounding the discharge zone carries out no movement, so that the discharge takes place absolutely without jerks.

According to a first embodiment of the invention the housing is made in two sections or parts, whereby the housing part into which a feed hopper opens carries out a reciprocating movement together with the feed hopper, while the second housing part, near and at the discharge zone, remains immovable.

Another embodiment of the invention provides that the housing is made of three sections or parts, the housing parts near the feeding and near the discharge end of the apparatus being spaced and immovable, while the third housing part which extends between the two above mentioned parts carries out a reciprocating movement.

The invention will now be explained in greater detail with reference to embodiments thereof which are represented in the accompanying drawing, wherein:

FIGURE 1 shows a diagrammatically illustrated kneading and mixing arrangement in longitudinal section, FIGURE 2 shows a variant of the kneading and mixing arrangement, also in longitudinal section, FIGURE 3 shows a detail of the seal between the fixed, and movable housing parts and FIGURE 4 shows a variant of FIGURE 3.

In the drawing, in the embodiment illustrated in FIGURE 1 the kneading and mixing arrangement comprises a gearing 1 which is coupled with a working shaft 2. The gearing 1 sets a working shaft 2 in rotation, whereby a change of the direction of rotation may be provided. The working shaft 2 is housed in a cylindrical housing 3 which is made in two parts, part 3.1 and part 3.2. The part 3.1 into which a feed hopper 6 opens is mounted for displacement in axial direction. The arrangement is such that part 3.1 makes an oscillating axial movement. The drive of the housing part 3.1 is shown to be affected by a crank motion mechanism generally designated 20. The second part 3.2 of the housing is stationary and constitutes the discharge zone for the worked product. The end of the housing part 3.2 carries a nozzle plate 14. 13 designates a gas-discharge opening of the housing part 3.2.

The working shaft 2 is provided in the region of the entry zone 5 for the material to be worked with thread 4 which are replaced in the kneading zone 8 by kneading thread portions 7. The kneading zone 8 extends from the mouth of the feed hopper 6 to the end of the housing part 3.1. With the kneading thread portions 7 co-operate kneading teeth 10 which are secured to the inner wall of the housing part 3.1 along a helical line so as not to interfere with the thread portions 7. The axial extent of the area of the thread portions 7 is approximately coextensive with the axial extent of the area of the kneading teeth 10. At the transition point between the housing parts 3.1 and 3.2 there is a tapered ring 11, and the seal is effected by a stuffing box 12. The construction of the seal can be seen in greater detail in FIGURE 3. The stuffing box 12 is provided with a stuffing box frame 12.1 so that a satisfactory seal is ensured. An oscillating edge 3.11 of the movable housing part 3.1 moves in the region of the gas discharge opening 13 so that self-cleaning is achieved.

In place of the stuffing box 12a bellows 15 may be used, as is seen in FIGURE 4. This bellows is secured at one end to the movable housing part 3.1 and at the other end to a flange 13.1 of the gas-discharge opening 13.

A somewhat modified embodiment is shown in FIGURE 2. Again a gearing 1 is provided which sets the working shaft 2 in rotation. This shaft is like shaft 2 of FIGURE 1 and again comprises threads 4 in the entry zone and in the discharge zone and kneading thread portions 7 in the kneading zone. In the case of this embodiment the housing is made in three parts. A housing part 3.3 is firmly connected with the gear box 1 and again carries a feed hopper 6. Following this in forward direction there is provided a cylindrical reciprocating housing part 3.4 which is equipped with kneading teeth 10 and carries out a movement oscillating in axial direction. The kneading teeth 10 co-operate with kneading thread portions 7. The discharge zone is surrounded by a housing part 3.5 which is stationary and equipped with a gas-discharge opening 13. 14 designates the nozzle plate on the stationary housing part 3.5. For the drive of the housing part 3.4 there is a shaft 16 which is supported in bearings 17 and 18 and is connected by means of a link 19 with the housing part 3.4. The shaft 16 is set in reciprocating movements by a crank motion mechanism 20. The sealing of the movable housing part is effected by the means shown in FIGURES 3 and 4.

If products with different properties are worked successively with the same arrangement, the need for adapting the operating conditions to the varied properties of the product arises.

It is possible for example to design the kneading shaft and the discharge screw portion so that the latter, when hollow, is easily interchangeable by being pushed over the end of the kneading shaft. A set of screw discharge portions with different core diameters and/or different pitches will allow the installing of the discharge portion most suitable to a specific product. This solution is simple, but has the disadvantages of loss of time when an exchange is made and of adaptability which is only by stages and not a continuous one.

A continuous, instantaneous adaptation to modified product properties is achieved if the cylindrical housing in which the discharge portion of the screw is so constructed that it is co-axially rotatable with the kneading shaft and is driven through a gearing with steplessly variable rotational speed. If the housing is so driven that its rotational speed and its direction of rotation are in conformity with the rotation speed and direction of rotation of the kneading shaft, the relative movement between screw and housing and thus the delivery output are equal to zero. If the housing is stationary a mean output is obtained, while the maximum output is obtained when the direction of rotation of the housing is opposite to that of the worm shaft.

The mixing and kneading arrangement as described delivers an absolutely uniform output and is outstandingly suitable for the working of synthetic plastics and for the shaping of profiles.

What we claim is:

1. A screw type kneading and mixing apparatus having a feeding and a discharge end, and a longitudinal axis, comprising
   (a) housing means including at least
      (1) a kneading section mounted for axial reciprocation,
      (2) a discharge section, said kneading section being rearwardly of said discharge section, when viewed toward said discharge end, and
      (3) kneading teeth secured along a helical line to at least a portion of the inner wall of said kneading section,
      (4) means for reciprocating said kneading section, and
   (b) a screw rotatably mounted within said housing means, said screw having
      (1) thread portions, the axial extend of the area of said thread portions being approximately coextensive with the axial extent of the area of said kneading teeth, said teeth extending into the spaces between said thread portions, and
      (2) helical threads approximately coextensive with said discharge section.

2. In the apparatus according to claim 1, said screw having further helical threads rearwardly of said thread portions, when viewed toward said discharge section.

3. In the apparatus according to claim 1, a feed hopper, said hopper opening into said kneading section at a point near said feeding end, and being adapted to reciprocate together with said kneading section.

4. The apparatus according to claim 1, wherein said housing means includes an entry section, said entry section being rearwardly of said kneading section and being successively followed by said kneading section and discharge section, said entry and discharge sections being axially immovable.

5. In the apparatus according to claim 1, said discharge section being provided with a gas-discharge opening having an inner mouth and leading from the interior to the atmosphere, said kneading section having an edge portion in the region of said inner mouth.

References Cited

UNITED STATES PATENTS

| | | | |
|---|---|---|---|
| 2,770,837 | 11/1956 | Reifenhauser | 259—9 |
| 3,023,455 | 3/1962 | Geier et al. | 259—9 |
| 3,102,694 | 9/1963 | Frenkel | 259—9 |
| 3,189,324 | 6/1965 | Gubler | 259—9 |

FOREIGN PATENTS 85,002   3/1957   Netherlands.

WILLIAM I. PRICE, *Primary Examiner.*

WALTER A. SCHEEL, *Examiner.*

R. W. JENKINS, *Assistant Examiner.*